(12) United States Patent
Yamazoe et al.

(10) Patent No.: US 7,885,459 B2
(45) Date of Patent: Feb. 8, 2011

(54) IMAGE PROCESSING METHOD AND APPARATUS THEREFOR

(75) Inventors: Manabu Yamazoe, Kawasaki (JP); Kentaro Yano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/210,458

(22) Filed: Sep. 15, 2008

(65) Prior Publication Data

US 2009/0009785 A1     Jan. 8, 2009

Related U.S. Application Data

(62) Division of application No. 11/668,059, filed on Jan. 29, 2007, now Pat. No. 7,426,299, which is a division of application No. 10/629,637, filed on Jul. 30, 2003, now Pat. No. 7,190,830, which is a division of application No. 09/337,548, filed on Jun. 22, 1999, now Pat. No. 6,628,825.

(30) Foreign Application Priority Data

Jun. 24, 1998  (JP) ................................. 10-177272

(51) Int. Cl.
    *G06K 9/00*     (2006.01)
(52) U.S. Cl. .................................................... 382/167
(58) Field of Classification Search ......... 382/162–167, 382/274–275; 358/518–522; 348/222.1–223.138; 355/38; 345/597–604
    See application file for complete search history.

(56) References Cited

U.S. PATENT DOCUMENTS

| | | | |
|---|---|---|---|
| 4,154,523 A * | 5/1979 | Rising et al. ................... 355/38 |
| 4,488,245 A | 12/1984 | Dalke et al. .................. 382/167 |
| 4,908,701 A | 3/1990 | Udagawa ..................... 358/809 |
| 4,928,167 A | 5/1990 | Tatsumi et al. ................. 358/80 |
| 4,984,071 A | 1/1991 | Yonezawa .................... 358/522 |
| 5,057,931 A | 10/1991 | Numakura et al. ....... 358/371.9 |
| 5,062,058 A | 10/1991 | Morikawa |
| 5,072,305 A | 12/1991 | Numakura et al. ......... 358/3.01 |
| 5,073,818 A | 12/1991 | Iida ............................. 358/80 |
| 5,181,105 A | 1/1993 | Udagawa et al. ............ 358/520 |
| 5,267,028 A * | 11/1993 | Suga et al. ............... 348/223.1 |
| 5,467,196 A | 11/1995 | Fukushima et al. ........ 358/3.15 |

(Continued)

FOREIGN PATENT DOCUMENTS

DE     43 09 879     10/1993

(Continued)

OTHER PUBLICATIONS

Office Action Appln. No. 2010-088188, Japanese Patent Office, Aug. 30, 2010.

*Primary Examiner*—Sherali Ishrat
(74) *Attorney, Agent, or Firm*—Fitzpatrick, Cella, Harper & Scinto

(57) ABSTRACT

An image processing method includes sampling image data of an original image, analyzing an image that includes the image data sampled in the sampling step, based on luminance and color components of the image data, determining a rotation matrix for a color balance correction based on an analysis result obtained in the analyzing step, and executing the color balance correction on the image data of the original image, based on the determined rotation matrix.

28 Claims, 7 Drawing Sheets

U.S. PATENT DOCUMENTS

| | | | |
|---|---|---|---|
| 5,563,666 A | 10/1996 | Suzuki | 348/645 |
| 5,680,230 A | 10/1997 | Kaburagi et al. | 358/520 |
| 5,696,839 A | 12/1997 | Siegeritz | 382/162 |
| 5,717,783 A | 2/1998 | Endo et al. | 382/167 |
| 5,748,773 A | 5/1998 | Tashiro et al. | 382/169 |
| 5,767,992 A | 6/1998 | Tanaka et al. | 358/520 |
| 5,937,089 A | 8/1999 | Kobayashi | 382/167 |
| 6,310,696 B1 | 10/2001 | Kumada | 358/1.9 |
| 6,463,172 B1 | 10/2002 | Yoshimura | 382/162 |
| 7,092,565 B2 | 8/2006 | Masaki | 382/167 |

FOREIGN PATENT DOCUMENTS

| | | |
|---|---|---|
| EP | 0 372 390 | 6/1990 |
| JP | 1-167791 | 7/1989 |
| JP | 1-236869 A | 9/1989 |
| JP | 7-222011 | 8/1995 |
| JP | 8-223433 | 8/1996 |
| JP | 9-009087 | 1/1997 |
| JP | 09-200796 A | 7/1997 |
| JP | 10-178557 | 6/1998 |

\* cited by examiner

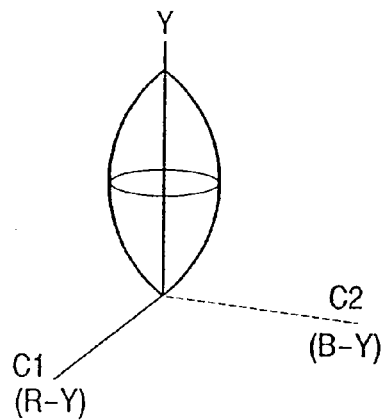
FIG. 5A
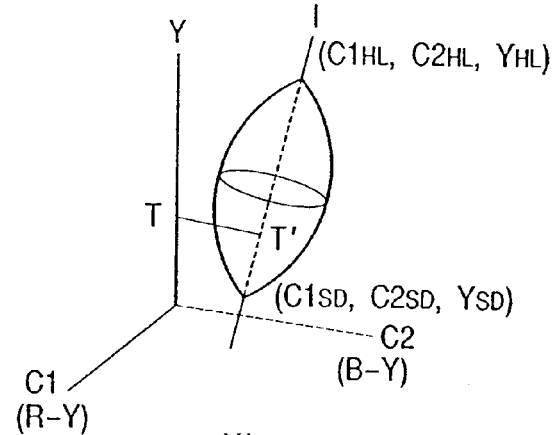
FIG. 5B
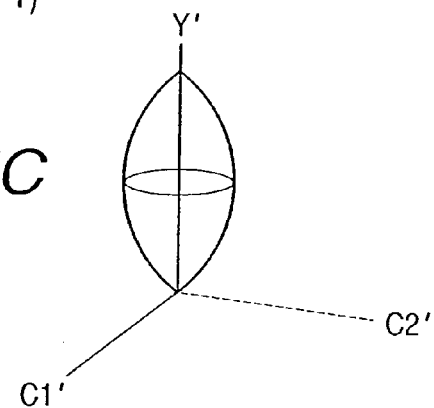
FIG. 5C
FIG. 6
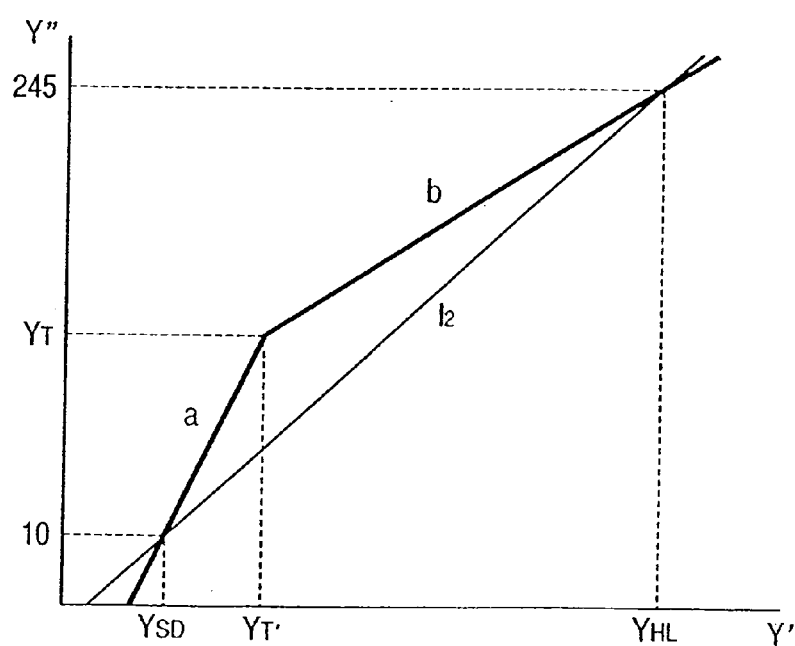

IMAGE PROCESSING METHOD AND APPARATUS THEREFOR

This application is a divisional application of application Ser. No. 11/668,059, filed Jan. 29, 2007, now U.S. Pat. No. 7,426,299, which issued on Sep. 16, 2008, which is a divisional of application Ser. No. 10/629,637, filed Jul. 30, 2003, now U.S. Pat. No. 7,190,830 B2, which issued on Mar. 13, 2007, which is a divisional of application Ser. No. 09/337,548, filed Jun. 22, 1999, now U.S. Pat. No. 6,628,825 B1, issued on Sep. 30, 2003.

This application also claims the benefit of Japanese Patent Application No. 10-177272, filed Jun. 24, 1998, which is hereby incorporated by reference herein in its entirety.

BACKGROUND OF THE INVENTION

1. Field of the Invention

The present invention relates to an image processing method, an apparatus and a memory medium therefor.

2. Related Background Art

For adjusting the color balance of a photographic image, there are conventionally known two methods, namely:

(1) matching the color balance before picture taking; and (2) correcting the image after picture taking.

As an example of the method (1), there is known a color balance adjusting method utilizing a white balance switch, for example, of a video camera. In this method, the white color balance of the taken image is adjusted by preliminarily taking white paper, or the like, before starting the main picture taking operation.

The method (2) is widely exercised, for example, in the printing field, but depends on the experience and intuition of experts.

On the other hand, with the recent spreading of digital cameras and photo scanners, the digitization of the photographic image can be easily achieved by general users. Also, the output equipment represented by an ink jet printer is progressing toward higher image quality and lower cost, so that general users can easily print the photograph at home.

However, in the case of printing a digitized photographic image, the quality of the outputted image is still insufficient.

For example, for printing the RGB signals from input equipment by output equipment represented by an ink jet printer, through a so-called personal computer, or the like, there has been tried color matching between the input equipment and the output equipment through the CIE XYZ color space by Color Think (trade name) in an Apple Macintosh™ computer or by CMS in Microsoft Windows (trade name). It is, however, very difficult to execute these adjustments in a strict manner, because the color production range is naturally different between the input equipment and the output equipment, and there is also involved a basic difference in the working principle that the input equipment works on the R, G and B light emissions, while the output equipment works on the C, M, Y and K reflective colors.

Even if the color matching is achieved between the input equipment and the output equipment by overcoming such difficulties, the image satisfactory for the user cannot be obtained merely by strictly reproducing the image from the input equipment as a print, if such an original image from the input equipment is not satisfactory. Such a situation arises in the case of an overexposure or an underexposure in the image taking or a distorted color balance of the entire image caused by a "color fog" phenomenon.

For example, in the case of auto picture taking by a camera with the AE (automatic exposure) function, there results a generally dark image of a so-called underexposure state if the background of the object is principally constituted by blue sky, but there results an overexposure state if the background is principally dark, so that the intended object is not always recorded in a best state.

Also, in the case of a digital camera, the image is picked up by a CCD, so that a wavelength region not sensitive to the human eye is also contained in the image signal. If such a signal is processed as a part of the RGB signals, the original invisible color becomes visible to distort the color balance. Naturally, there is incorporated an infrared cut-off filtering, but such filtering is not necessarily complete, and the color balance cannot be completely corrected within the limitation of real-time processing. As a result, there is caused a "color fog" phenomenon, distorting the color balance of the entire image.

Since similar phenomena may occur in a photo scanner or a flat bed scanner, the color balance may be distorted in the digitization with such a scanner, even if the original negative or reversal film is in an optimum state.

Therefore, in order to obtain a satisfactory output result, it is necessary to correct the input image data into image data of appropriate exposure with a satisfactory color balance, and, for this purpose, there is required a simple method not requiring cumbersome operations by the user, with a sufficiently acceptable processing speed.

SUMMARY OF THE INVENTION

In consideration of the foregoing, an object of the present invention is to enable color balance correction of high-definition image data with a simple configuration.

The above-mentioned object can be attained, according to the present invention, by an image processing method of detecting the luminance of a highlight point and a shadow point of an original image, determining the chromaticity of the highlight point and the shadow point from plural pixels of the luminance, and executing a correction process on the original image based on the highlight point, the shadow point and the chromaticity, wherein the correction process executes matching of the color solid axis of the original image with an axis indicating the luminance and contrast adjustment on a color component indicating the luminance of the original image.

Another object of the present invention is to enable judgment of the image state by a very simple method and optimum correction automatically, according to such a judgment.

The above-mentioned object can be attained according to the present invention, by an image processing method comprising steps of:

detecting the color solid axis of an original image;

judging the exposure state of the original image from the positional relationship between the color solid axis and an axis indicating the luminance in a color space in which the color solid is represented; and setting an image correcting condition according to the result of the judgment.

The above-mentioned object can also be attained by an image processing method for effecting an image correction process on an original image according to the color distribution thereof, the method comprising steps of:

detecting the color solid axis of the original image in a predetermined color space; and controlling the image correction process based on the positional relationship of the color solid axis in the color space.

BRIEF DESCRIPTION OF THE DRAWINGS

FIGS. 5A, 5B and 5C are schematic views of a color solid indicating the distribution of luminance and hue;

FIG. 6 is a chart showing a non-linear gamma conversion function;

FIGS. 7A, 7B, 7C and 7D are charts showing features of overexposure and underexposure on a luminance-saturation plane, wherein FIG. 7A is a chart showing the concept of an overexposure, FIG. 7B is a chart showing the concept of an underexposure, FIG. 7C is a chart showing an exposure of overexpousre, and FIG. 7D is a chart showing an example of underexposure;

DETAILED DESCRIPTION OF THE PREFERRED EMBODIMENTS

Now, the present invention will be discussed in detail by preferred embodiments thereof with reference to the attached drawings.

First Embodiment

In the image processing method of the present embodiment, the original RGB image data are converted into luminance and chromaticity data indicating the brightness and the hue for each pixel. In this operation, the pixels are selected in succession, skipping a pixel for which the saturation of the original image data exceed a predetermined value, and a luminance histogram is prepared. Then, the luminance positions (luminance values), for which the cumulative numbers from the high and low luminance sides reach respectively predetermined values, are determined as a white position (highlight point) and a black position (shadow point). In this operation, in order to improve the accuracy of detection of the white and black positions, there may be adopted a process of excluding the high saturation pixels from the luminance histogram.

Then, there are calculated the average value of the chromaticity of the pixel data having the luminance value identified as the white position and the average value of the chromaticity of the pixel data having the luminance value identified as the black position, and a straight line connecting these points in the color space is identified as the color solid axis (gray line). The inclination of the color solid axis with respect to the luminance axis indicates that the color solid axis, which should originally indicate the change in the luminance, only includes a change in the chromaticity, namely, that there is generated a color fog. The color fog is corrected by executing a conversion process (rotational matrix calculation) on all the pixels in such a manner that the color solid axis assumes the normal position in the above-mentioned color space. In the following, the present embodiment will be explained in further detail with reference to the attached drawings.

[Configuration of Image Processing System]

Figure 1:
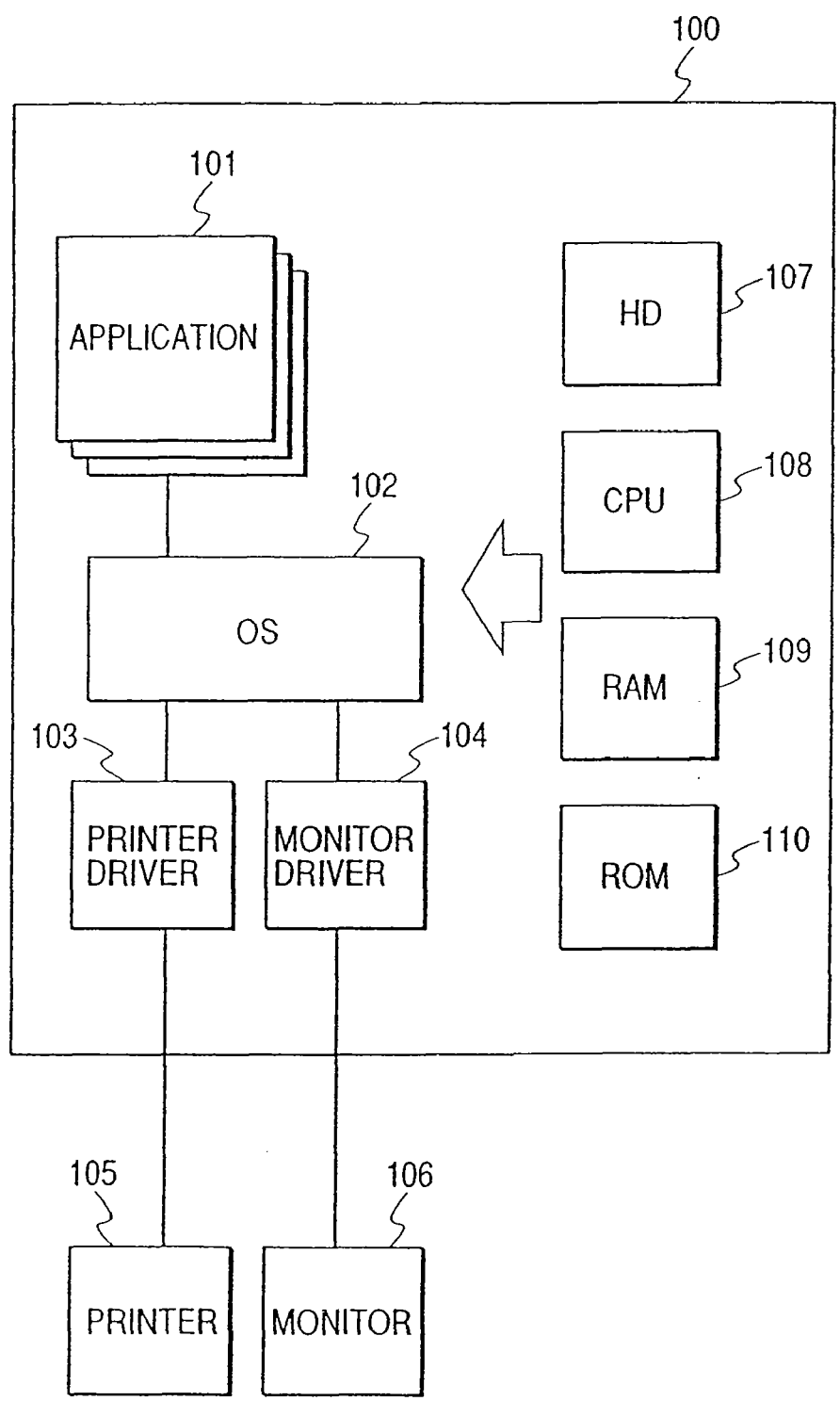
FIG. 1 is a block diagram of an image processing apparatus.

An example of the system in the present embodiment is shown in FIG. 1. For example, a printer 105, such as an ink jet printer, and a monitor 106, are connected to a host computer 100. The host computer 100 is provided with application software 101, such as a word processor, a table calculation, an internet browser, etc., an operating system (OS) 102, a printer driver 103 for preparing print data by processing various drawing commands (an image drawing command, a text drawing command, a graphics drawing command, etc.), indicating an output image issued by the application software 101 to the OS 102, and a monitor driver 104 for displaying on the monitor 106 by processing various drawing commands issued by the application software 101.

The host computer 100 is provided, as the hardware for operating the various software, with a central processing unit (CPU) 108, a hard disk driver (HD) 107, a random access memory (RAM) 109, a read-only memory (ROM) 110, etc.

As an example of the image processing system shown in FIG. 1, there can be conceived a configuration employing a personal computer compatible with PC-AT of IBM and Windows 95 of Microsoft as the operating system, installing a desired application for executing printing and connecting a monitor and a printer.

In the host computer 100, based on an image displayed on the monitor, an application 101 prepares output image data utilizing text data classified as text, such as a character, graphics data classified as graphics, and image data classified as a natural image. For printing, the output image data, the application 101 sends a print output request to the OS 12 and sends thereto a group of drawing commands consisting of graphics drawing commands for the graphics data and image drawing commands for the image data. In response to the output request from the application, the OS 102 issues the drawing command group to a printer driver 103 corresponding to the output printer. The printer driver 103 prepares print data, printable by the printer 105, by processing the print request and the drawing command group entered from the OS 102, and transfers such print data to the printer 105. In a case in which the printer 105 is a raster printer, the printer drive 103 executes an image correction process in succession on the drawing commands from the OS, then executes rasterization into a page memory having a capacity of twenty-four bits for the RGB signals, then, after the rasterization of all the drawing commands, converts the content of the page memory into a data format printable by the printer 105, for example, CMYK data, and transfers the converted data to the printer.

Figure 2:
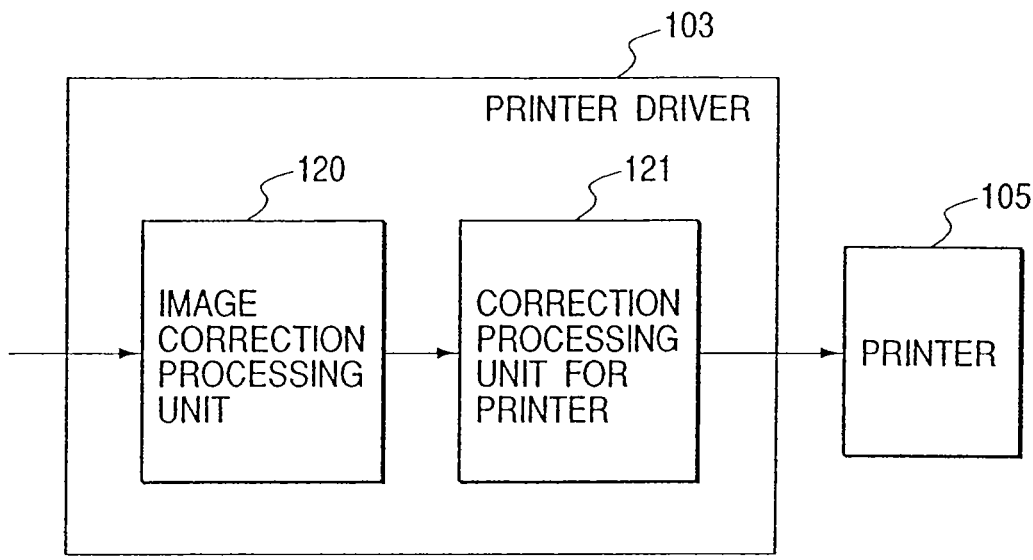
FIG. 2 is a block diagram of a printer driver.

The process executed in the printer driver 103 will be explained with reference to FIG. 2.

In the printer driver 103, an image correction process unit 120 executes an image correction process to be explained later, on the color information of the image drawing commands contained in the drawing command group entered from the OS 102. A correction process unit 121 for the printer rasterizes the drawing commands, utilizing the color information subjected to the image correction process, thus, generating dot image data on the RGB 24-bit page memory. Then, it executes masking, gamma correction, quantization, etc., for each pixel according to the color reproducibility of the printer, and generates and sends the CMYK data dependent on the printer characteristics to the printer 105.

[Image Correction Process Unit]

In the following, there will be explained, with reference to FIGS. 3 to 7D and 9, the process executed in the image correction process unit 120 on the original image represented by the image drawing commands. The following process is not executed on the original image represented by the graphic drawing commands or by the text drawing commands.

Figure 3:
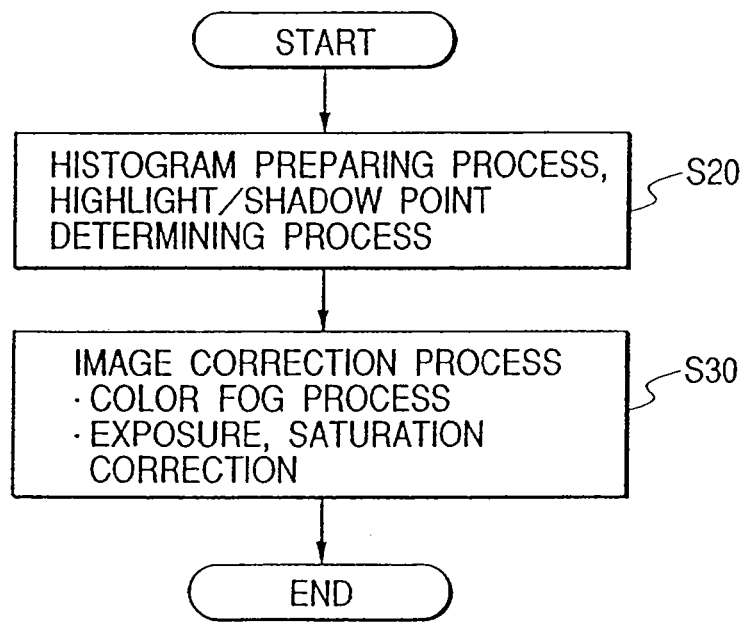
FIG. 3 is a flow chart showing the control sequence of an image correction process unit.

The image correction process unit 120 of the present embodiment executes, as shown in FIG. 3, a histogram preparation process (S20) and an image correction process (S30) according to the histogram. The step S20 prepares a histogram by a process shown in FIG. 4, and the highlight point and the shadow point of the image are determined from the thus prepared histogram.

[Preparation of Luminance Histogram]

Figure 4:
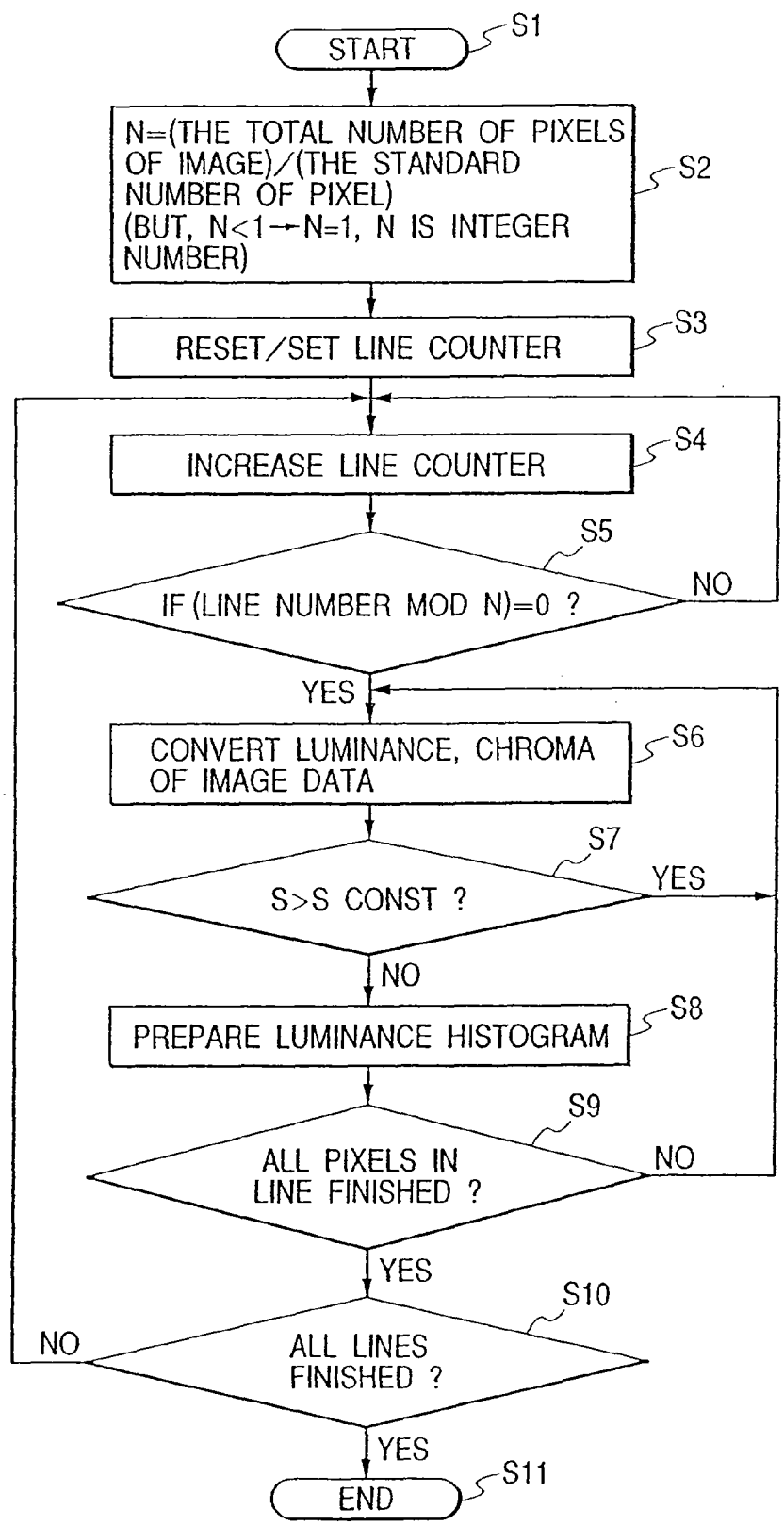
FIG. 4 is a flow chart showing the sequence of preparing a luminance histogram.

FIG. 4 is a flow chart showing the preparation of a luminance histogram in the present embodiment.

Referring to FIG. 4, a step S1 initiates the routine for preparing the luminance histogram of the original image. A step S2 determines the ratio of selection of the pixels to be used for preparing the luminance histogram from the pixels of the original image. In the present embodiment, the luminance histogram is prepared from all the pixels (selection ratio 1 (or 100%)) in a case in which the image data to be processed have 350,000 pixels. In a case in which the entered image data have a number of pixels larger than 350,000 pixels, the pixels are selected (sampled) according to the ratio of the total number of pixels to be 350,000 pixels. For example, if the input image data are of 3,500,000 pixels, the selection ratio is 3,500/350=10, so that the luminance histogram is prepared at a rate of one out of ten pixels (selection ratio 10 or 10%). In the present embodiment, the selection ratio is determined from the following formula:

$$n = \text{int}(\text{total pixel number of object image data}/350,000)$$

(however, if n<1, n is selected as 1, and n being a positive number).

Then, a step S3 resets a counter for managing the line number or sets it at a predetermined initial value, and a step S4 increases the content of the counter to a line number of the object line.

In the present embodiment, the sampling of the pixels is executed in the unit of a line. Therefore, for a selection ratio n, the line number is divided by n, and, if the remainder is zero, the pixels belonging to such a line are selected for processing (S5—YES). For example, for a selection ratio of ten, the line number is divided by ten and, if the remainder is zero, the pixels belonging to the line are selected for processing.

If the object line is to be skipped and not to be processed, the sequence returns to the step S4. If the object line is to be processed, the sequence proceeds to a step S6, and the pixels belonging to such a line are subjected to luminance conversion and chromaticity conversion in succession. In the present embodiment, the luminance conversion and chromaticity conversion are executed according to the following equations. However, such conversions are not limited to these equations, but can also be achieved by various equations:

$$Y(\text{luminance}) = \text{int}(0.30R + 0.59G + 0.1B) \, (Y \text{ being positive});$$

$$C1(\text{chromaticity}) = R - Y;$$

$$C2(\text{chromaticity}) = B - Y.$$

Also, in the present embodiment, in order to improve the accuracy of detection of the white position (highlight point) and black position (shadow point), the saturation S of an object pixel is calculated by the following equation and is compared with a predetermined saturation value (Sconst) (S7), and, if the saturation S is larger, the information of such a pixel is not reflected in the luminance histogram:

$$\text{Saturation } S = \text{sqrt}(C1^2 + C2^2)$$

wherein sqrt(x) is a function giving the square root of x, and $x^y$ means x to a power of y.

Thus, in case S>Sconst, the sequence returns to the step S6 and the data of the object pixel are not reflected in the succeeding process. This is because, as will be explained later, the saturation of the white position is given by the average saturation of a group of pixels of high luminance and such saturation indicates an error caused by the color fog, so that the pixels assumed as of originally high saturation had better be eliminated from the calculation of the highlight point. The effect of this process will be explained by a specific example. For example, a yellow pixel (R=G=255, B=0) has a luminance Y=226 and a saturation S=227, according to the foregoing equations. Thus, this pixel has an extremely high luminance and a sufficiently high saturation. Such a pixel should be considered as originally yellow in most cases, rather than considered as generated by yellow color fogging of an originally colorless pixel. If the pixel of such high luminance and high saturation is included in the luminance histogram, an error is generated in the detected white position. Therefore, in the present embodiment, there is determined a certain saturation (Sconst) and the pixel of which saturation exceeds such a predetermined saturation is not included in the luminance histogram. Such a method provides the ability to prevent the error caused by the pixels of high saturation in the detected white position, thereby improving the accuracy of the white position.

After such a discrimination in step S7, the luminance histogram is prepared on the pixels satisfying the condition S≦Sconst (S8). As the pixel data employed in the present invention have eight bits (256 density levels) for each of RGB data, the luminance is also converted into 256 levels. Consequently, the luminance histogram is obtained by counting the frequency of pixels in each of 256 luminance levels.

Also, in the present embodiment, the calculated chromaticity values C1, C2 are retained in the following manner, since they are used for calculating the average chromaticity of the pixels of each luminance level, in the color fog correction to be explained later. In a structurally arranged variable with an index from 0 to 255, the frequency, cumulative C1 value and cumulative C2 value are set as three members, and the result of calculation for each pixel is reflected in a member having the index corresponding to the luminance value of the pixel.

When the process on the object pixel is completed, there is discriminated whether all the pixels in the object line have been processed (S9), and, if any unprocessed pixel remains in the object line, the sequence returns to step S6 to repeat the process thereafter. When all the pixels in the object line have been processed, a step S10 discriminates whether any line remains unprocessed, and, if all the lines have been processed, a step S11 terminates the sequence, but, if any unprocessed line remains, the sequence returns to step S4, and the above-described process is repeated with the object line shifted to a next line.

The preparation of the luminance histogram with the selection of the pixels of the original image data in the above-described manner provides the ability to obtain a histogram with a minimum necessary number of pixels, and with consideration of improvement in the accuracy in the detection of the white and black positions afterwards.

[Determination of White Position (Highlight Point) and Black Position (Shadow Point)]

After the preparation of the luminance histogram, it is used for determining the white position (highlight point) and the black position (shadow point). In the present embodiment, the black and white positions are defined as points where the cumulative luminance frequency reaches 1750 from both ends (luminance value 0 and 255) of the luminance histogram toward the center thereof.

More specifically, the frequency PY of the pixels of a luminance value Y is cumulatively added as P0+P1+ . . . and the luminance value when the cumulative frequency reaches 1750 is defined as the luminance value YSD of the black position. Then, there is calculated the average chromaticity of the pixels of the luminance YSD. As explained in the foregoing, the cumulative values of chromaticity for each luminance value are calculated at the preparation of the luminance histogram (cumulative chromaticity values C1Ntotal, C2Ntotal, for pixels of luminance N), so that the average chromaticity values C1SD, C2SD of the pixels with the luminance value YSD, corresponding to the black position, are determined by the following equations:

$$C1SD = C1YSDtotal/PYSD;\text{ and}$$

$$C2SD = C2YSDtotal/PYSD.$$

The white position is similarly determined by calculating the cumulative frequency P255+P254+ . . . and the luminance value where the cumulative frequency exceeds 1750 is defined as the luminance YHL of the white position. Then, calculated are the average chromaticity values C1HL, C2HL of the pixels of the luminance YHL in the following manner:

$$C1HL = C1YHLtotal/PYHL;\text{ and}$$

$$C2HL = C2YHLtotal/PYHL.$$

The above-described calculations provide the ability to determine the white position (C1HL, C2HL, YHL) and the black position (C1SD, C2SD, YSD) in the (C1, C2, Y) color space.

In the present embodiment, the cumulative frequency is determined from the luminance positions of the luminance values 0 and 255, but there may be given a certain offset, such as a determination from the luminance values 1 and 254.

As explained above, a step S20 in FIG. 3 determines the white position (highlight point) and the black position (shadow point).

Then, a step S30 in FIG. 3 executes an image correction process, based on the white and black positions determined in step S20. The image correction process in the present embodiment includes color fog correction for correcting the color fog in the original image, exposure correction for correcting the luminance contrast for optimizing the exposure of the original image, and saturation correction for improving the color appearance of the output image.

Figure 9:
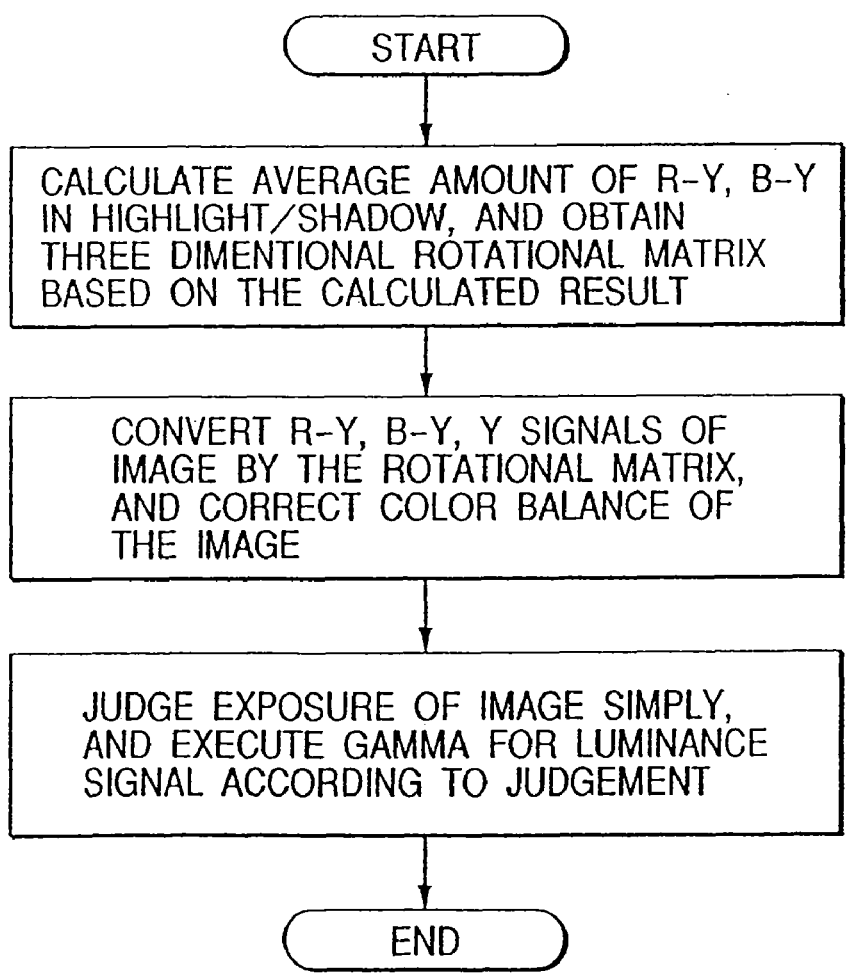
FIG. 9 is a flow chart showing the control sequence of image correction.

FIG. 9 shows the flow of a correction process executed by the image correction process unit 120 in step S30 in FIG. 3. At first, a rotation matrix for color fog correction is determined. Then, color balance (color fog) is corrected by the rotation matrix, and the gamma conversion is executed for the luminance signal according to the exposure status of the image. These steps will be explained in succession.

[Color Fog Correction]

After the above-described determination of the white and black positions of the original image in the (C1, C2, Y) color space, the color fog correction is executed.

If the original image is an ideal image without color fog, R=G=B on the colorless axis, and the calculated chromaticity values for the white and black positions should satisfy C1HL=C2HL=C2SD. However, in the presence of a color fog, the line connecting (C1HL, C2HL, YHL) and (C1SD, C2SD, YSD), namely, the color solid axis, shows an inclination toward the color of such color fog, in proportion to the level of the color fog. The color fog correction can be achieved by a conversion in such a manner that the color solid axis coincides with the Y-axis (luminance axis). The conversion may be achieved by rotation and parallel translation of the color solid, or by conversion of the coordinate system.

In the present embodiment, the color solid of the original image is at first rotated, taking the minimum luminance point (lowest point) of the color solid axis as the center of rotation, until the color solid axis becomes parallel to the Y-axis. Then, the coordinate system is converted in such a manner that the above-mentioned minimum luminance point becomes the original point of the (C1, C2, Y) space. After such color fog correction, the color solid shown in FIG. 5B becomes as shown in FIG. 5C. The conversion provides a result having the original point at the minimum luminance point and the color sold axis coinciding with the Y-axis. FIG. 5A shows a color solid of the image data having an ideal color distribution without color fog. The above-described conversion brings the color solid after conversion (FIG. 5C) close to the ideal color solid (FIG. 5A).

In the rotation for bringing the color solid axis parallel to the Y-axis, the axis and angle of rotation can be easily determined from the coordinate values of the shadow and highlight points. The method of determining the rotation matrix for rotating a solid in a three-dimensional space by a desired angle about a desired axis is already known and will not be explained in detail.

The color fog correction can be corrected, as explained in the foregoing, by converting each pixel of the original image into pixel data (C1, C2, Y) in the three-dimensional color space represented by chromaticity values and luminance, and applying rotation and parallel transition to such pixel data to obtain pixel data (C1', C2', Y), for which the color solid axis (gray line), connecting the black and white positions, coincides with the Y-axis and the minimum luminance point is at the original point of the coordinate system.

[Adjustment of Contrast and Saturation]

In the following, there will be explained a method for further improving the quality of the image by adjustment of contrast and saturation, of judging the over/underexposure of the state of the image in a simple manner and, accordingly, applying gamma correction to the luminance signal.

The contrast adjustment is executed by adjusting the luminance of the black position (shadow point) to "0" or a value close thereto (for example, "10") and that of the white position (highlight point) to "255" or a value close thereto (for example, "245").

In the following, there will be explained an embodiment of judging the over- or underexposure state of the image exposure in a simple manner and, accordingly, applying gamma correction to the image data.

At first, there are determined points T, T' in FIG. 5B, showing the minimum distance between the color solid axis to be corrected and the luminance (Y) axis. These points can be easily determined from the geometrical relation.

Then, the contrast is adjusted so that the luminance component YT' of the point T' after the color fog correction becomes equal to the luminance component YT of the point T. As shown in FIG. 6, a point (YT, YT') is taken as an inflection point, and, if luminance Y' after the color fog correction is less than YT', the luminance is corrected to Y" by a function given by a straight line a, and, if it is larger than YT', the luminance is corrected to Y" by a function given by a straight line b.

Naturally, there may be executed a correction indicated by a line 12 in FIG. 6, without using T, T'. If the color solid axis is parallel to the luminance axis, the point pair T, T' is not uniquely determined, and, if T, T' are positioned outside the luminance range (0, 255), the point (YT, YT') cannot be taken as the inflection point. In such a special case, the correction can be made according to the line 12.

Figure 7A:
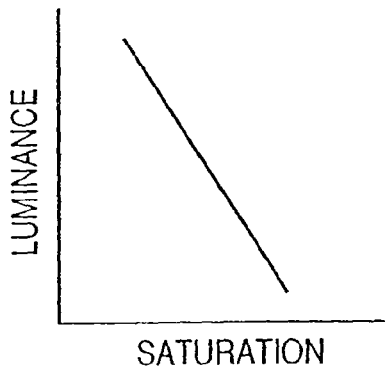
Figure 7B:
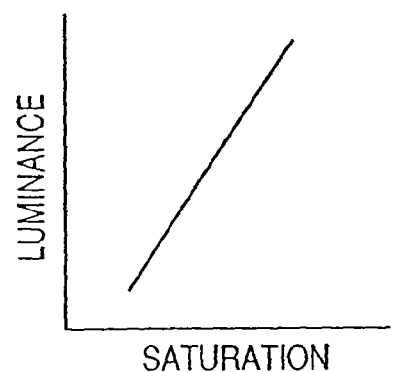

The correction utilizing the closest points T, T' of two axes becomes effective, particularly, on the image involving over- or underexposure. The overexposure is induced by a fact that the exposure for the entire image is influenced by a lighter area, such as the sky. In such a situation, the input device represented by a digital camera executes suppression of the color of high luminance, reducing the saturation of the high luminance area. As will be understood from the color solid axis of the image subjected to such suppression of the color of high luminance, represented on a saturation-luminance two-dimensional plane shown in FIG. 7A, the pixel closest to gray appears in the high luminance area. On the other hand, for an underexposure image, the saturation becomes lower in the low luminance area, as shown in FIG. 7B, because of the suppression of the color of low luminance.

Figure 7C:
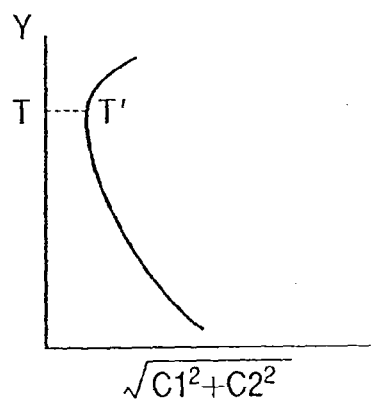
Figure 7D:
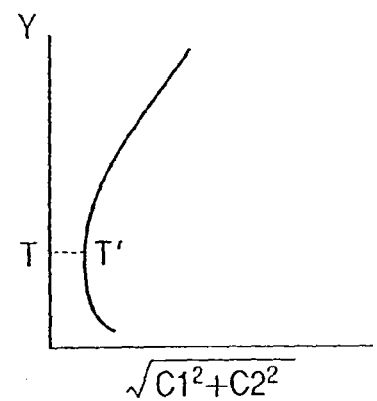

In the actual image, the luminance axis of the color solid assumes a form shown in FIG. 7C for an overexposed image, on the luminance-saturation plane. On the other hand, an underexposed image assumes a form as shown in FIG. 7D. If the actual color solid is considered to be displaced from the original color solid in the ideal state by the influence of image taking conditions or input conditions at the D/D conversion, the points T, T' are considered to indicate the positions of minimum displacement. In the present invention, such a displacement is eliminated, to obtain appropriate gray in a simple manner, thereby correcting the brightness level of the entire image.

It is naturally also possible to use T solely as a means for simply judging the over- or underexposure state of the image, to prepare look-up tables (LUT) for the under- and overexposure states and to execute the gamma adjustment of the luminance signal according to the luminance component of the point T or T'. For example, the contrast adjustment may be made with a curve having an inflection point at (YT, YT') in FIG. 6. It is thus possible to simply judge, by the values of T, T', whether the image is over- or under exposed. Stated differently, the luminance component of the point T', showing the lowest saturation on the color solid axis, is positioned at the high luminance side, the image shows a luminance-saturation relationship, as shown in FIG. 7A, and, if the luminance component of the point T' is at the low luminance side, the image shows a luminance-saturation relationship, as shown in FIG. 7B. Therefore, in an image subjected to the suppression of the color of high luminance and low luminance, the image is considered to be in an overexposure state or in an underexposure state, if the luminance component of the point T' is respectively at the high luminance side or at the low luminance side.

On the other hand, the saturation can be easily adjusted by multiplying the color differences C1, C2 with saturation correction coefficients. As an example, for an increase of the saturation by 20%, a saturation correcting coefficient of 1.2 is adopted, and the saturation can be corrected by:

$$C1''=1.2 \times C1'; \text{ and}$$

$$C2''=1.2 \times C2'$$

because the saturation is defined by:

$$\text{Saturation}=\text{sqrt}(C1 \frown C2+C2 \frown).$$

[Inverse Conversion to RGB Space]

The corrections in the present embodiment are completed as explained above. In this state, each pixel of the original image is converted from the (R, G, B) color signal data into (C1", C2", Y") color space data, which have to be converted into (R', G', B') color signal data according to the following equations:

$$R'=Y''+C1'';$$

$$G'=Y''-(0.3/0.59) \times C1''-(0.11/0.59) \times C2''; \text{ and}$$

$$B''=Y''+C2''.$$

In this manner, there can be obtained RGB data, which are corrected from the original image in the color fog, contrast and saturation.

As explained in the foregoing, the present embodiment provides the ability to assure correction of the color fog with limited load of processing.

Also, in the present embodiment, as the sampling condition is selected according to the image data size of the original image, there can be maintained a substantially constant relationship between the entire frequency in the histogram and the cumulative frequencies for determining the white and black positions, regardless of the input image. Consequently, there can be realized satisfactory color fog correction.

In addition, by executing the non-linear gamma correction on the entire image so as to maintain the luminance at a point where the axis of the color solid of the image to be corrected is closest to the luminance axis, there can be achieved contrast correction, while maintaining the luminance presumably closest to that of the original image.

Furthermore, it is possible to easily obtain the over- or underexposure state of the image, and to apply a gamma correction by selecting a table according to such an exposure state.

The pixel sampling may also be executed in the unit of a column, instead of the unit of a line.

Second Embodiment

In the following, there will be explained a second embodiment, which takes the level of correction into consideration with respect to the first embodiment.

As explained in the first embodiment, if the axis of the color solid determined from the image shows an excessively large inclination, the correction of such an axis may result in the deterioration of the image quality. Such a situation may arise in a case, for example, that the color fog is intentionally caused by the use of a color filter, or the image is taken under a sunset environment.

In such a case, such a drawback can be avoided by judging that the determined highlight and shadow points are erroneous, and not executing the correction, or suitably adjusting the rotation angle, thereby attenuating the level of correction. Such judgment that the highlight and shadow points are erroneous can be derived from the direction of the color solid axis.

Since the color of the color fog can be easily judged from the inclination of the color solid axis, it is possible not to execute the color fog correction for an image taken, for example, with a color filter, for obtaining special effects.

In such a situation, the angle between the direction vector of the color solid axis and the luminance axis is used for judging that the color fog correction results in a deterioration of the image, and the correction is not executed or is weakened in the level. For example, if the color solid axis is directed toward red, and is inclined in excess of a predetermined angle, for example, 40°, such an image is judged to inherently contain a color fog. The color fog correction with a weakened level can be achieved, for example, by raising the color solid axis by a predetermined angle, for example, by 20°, or to a predetermined angle, for example, an angle of 20° to the Y-axis. The rotation matrix for such a conversion can be easily determined from the rotation axis and the rotation angle.

The level of the above-mentioned correction can be manually designated by the user, or set in advance, according to the magnitude of the angle and the direction of the color solid axis. In the foregoing description, the color solid of the image showing an inclination of 40° is raised by rotation by 20°, but the level of such correction may be designated by the user. The succeeding process is the same as that in the first embodiment.

Also, as the color of the color fog can be easily judged from the direction of the color solid axis, it is possible, for example, not to execute correction in the direction of the color of the filter, for an image taken with a color filter for obtaining a special effect. In such a case, there is designated a color for which the color fog is not corrected, then, a rotation axis for conversion is set along the non-corrected color on the C1-C2 plane, and the color solid is rotated until a plane containing such a rotation axis and the color solid axis 1 becomes parallel to the Y-axis. Such a method provides the ability to correct the color fog only for the specified color components.

Figure 10:
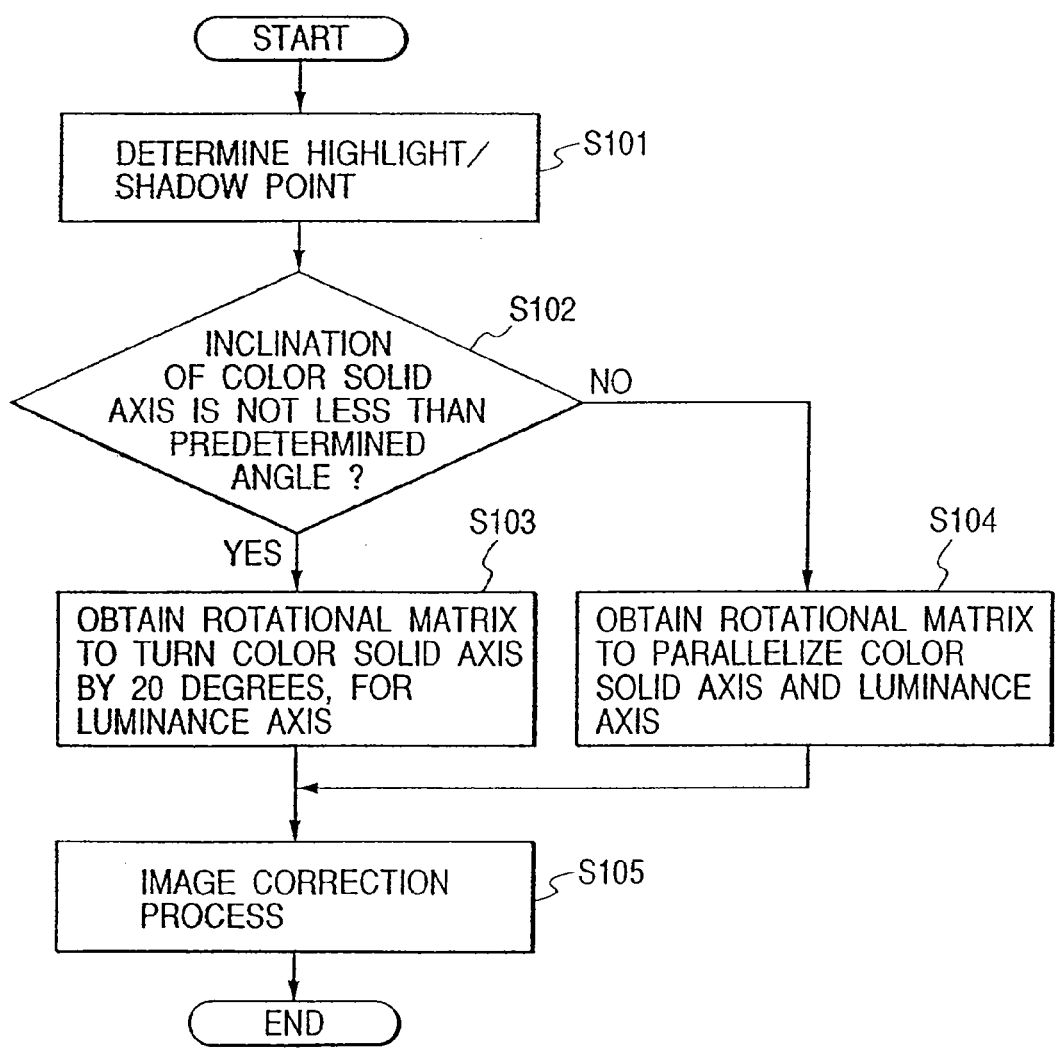
FIG. 10 is a flow chart showing the control sequence of color fog correction in a second embodiment.

FIG. 10 is a flow chart showing a sequence for image correction by rotating the color solid to a separately designated angle in case the color solid angle is inclined at least by a predetermined angle. At first, a step S101 determines the highlight and shadow points, and step S102 discriminates whether the color solid axis is inclined at least by a predetermined angle. If it is less than the predetermined angle, steps S104, S105 correct the color fog by such a conversion as to bring the color solid axis to the luminance axis, as in the first embodiment.

On the other hand, if the color solid axis is inclined by at least the predetermined angle, step S103 determines a rotation matrix for rotating the color solid axis by 20° toward the luminance axis, and step S105 executes color fog correction by rotating the color solid with such a rotation matrix. In this process, the angle 20° employed in step S103 may be altered arbitrarily.

It is also possible to set threshold values at two levels, and, if the inclination of the color solid axis is larger than a first threshold value (for example, 40°), to rotate the color solid axis, thereby raising it (for example, 20°) to a not completely gray level. If the inclination is between the first and second threshold values (for example, 20°), the conversion by rotation is not executed, and, if the inclination is less than the second threshold value, the conversion is executed in such a manner that the color solid axis coincides with the luminance axis. Such a method provides the ability to avoid defective correction for the image having intentional color fog.

As explained in the foregoing, it is possible to set at least two threshold values for correction based on the inclination of the axis, namely, the direction and angle thereof, of the color solid constituted by the pixels of the image data, thereby judging whether the image correction is to be executed, not to be executed or executed with an adjusted level, thus, excluding the defects of the special case in a very simple manner.

It is also possible not to correct the color fog in a specified color, since the color of the color fog can be easily judged from the direction of the color solid axis.

Third Embodiment

In the foregoing first to third embodiments, the color balance correction has been explained based on the highlight and shadow points of the image. In the following, there will be explained an embodiment of the correction on other reference points.

Figure 8:
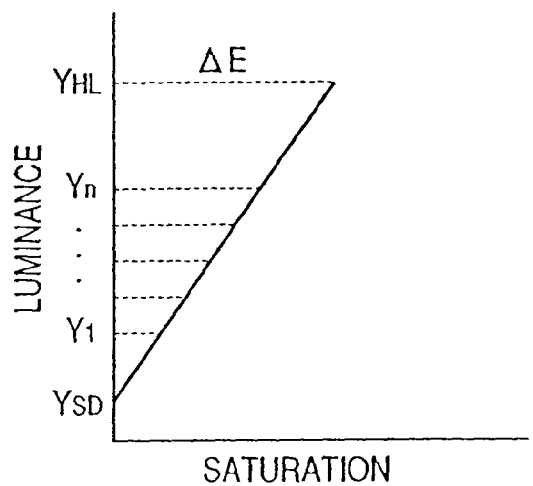
FIG. 8 is a chart showing the manner of determining the color solid axis in a third embodiment.

At first, there is determined the average color difference $\Delta E$ at the highlight and shadow points by the following equation:

$$\Delta E = \text{sqrt}((C1HL-C1SD)^2 + (C2HL-C2SD)^2),$$

in which $\Delta E$ should be zero, if the color solid axis is parallel to the luminance axis, but becomes larger than zero if it is inclined. FIG. 8 shows this relation on an E (saturation)–Y (luminance) plane.

Then, several sample luminances are selected between the highlight and the shadow, and the average color difference is determined, as shown in FIG. 8, for the pixels having a luminance Yn in the image and having a saturation smaller than $\Delta En$. The average color difference $\Delta En$ may be a predetermined saturation or the average color different limited to the direction of inclination of the color solid axis.

Then, a line is determined by the least square method on the average color difference of these several points, and the process of the first embodiment is executed, taking such a line as the color solid axis.

Otherwise, there may be executed non-liner color balance correction by determining a B-spline curve approximating the points having the determined color difference and luminance, taking such a curve as the luminance axis, thereby bringing the color difference to zero.

In this manner, the line constituting the luminance axis can be obtained not from the highlight and the shadow only, but from the pixels uniformly sampled from the entire image. Thus, the color fog correction reflecting the characteristics of the entire image can be achieved by converting the image in such a manner that the thus obtained line coincides with the luminance axis.

The present invention has been explained by preferred embodiments thereof, but the present invention is not limited by such embodiments, and is subjected to various modifications within the scope and spirit of the appended claims.

Other Embodiment

The present invention may be applied to a system consisting of plural equipment (for example, a host computer, interface devices, a reader, a printer, etc.) for an apparatus consisting of a single piece of equipment (such as a copying machine or a facsimile apparatus).

Also, the objects of the present invention can be attained in a case where a memory medium storing program codes of sequences shown in FIGS. 3, 4, 9 and 10 is supplied to the system or apparatus, and a computer (or a CPU or an MPU) of the system or the apparatus reads and executes the program codes stored in the memory medium.

In such a case, the program codes themselves read from the memory medium realize the functions of the aforementioned embodiments, and the memory medium so storing such program codes constitutes the present invention.

The memory medium storing such program codes can be, for example, a floppy disk, a hard disk, an optical disk, a magnetooptical disk, a CD-ROM, a CD-R, a magnetic tape, a non-volatile memory card, or a ROM.

The present invention includes not only the case where the computer executes the read program codes to realize the functions of the aforementioned embodiments, but also, a case where an operation system, or the like, functioning on the computer, executes all the actual processes or a portion thereof under the instruction of the program codes, thereby realizing the functions of the aforementioned embodiments.

The present invention further includes a case wherein the program codes read from the memory medium are once stored in a memory provided in a function expansion board of the computer, or a function expansion unit connected to the computer, and a CPU, or the like, provided in the function expansion board or the function expansion unit, executes all the processes or a portion thereof according to the instruction of such program codes, thereby realizing the functions of the aforementioned embodiments.

What is claimed is:

1. An image processing method comprising:
   using a processor to perform the following steps:
   (i) sampling image data of an original image;
   (ii) analyzing the image data sampled in said sampling step, based on luminance and color components of the image data;
   (iii) determining a rotation matrix for a color balance correction based on an analysis result obtained in said analyzing step; and
   (iv) executing the color balance correction on pixel data of the original image, based on the rotation matrix determined in said determining step.

2. An image processing apparatus comprising:
   a sampling device for sampling image data of an original image;
   an analyzer for analyzing the image data sampled by said sampling device, based on luminance and color components of the image data;
   a determining device for determining a rotation matrix for a color balance correction based on an analysis result obtained by said analyzer; and
   an executing device for executing the color balance correction on pixel data of the original image, based on the rotation matrix determined by said determining device.

3. An image processing method according to claim 1, wherein said sampling step comprises thinning the image data by a line unit.

4. A image processing method according to claim 1, wherein said analyzing step comprises generating a luminance histogram for analysis by excluding the image data that have high luminance and high saturation.

5. A image processing method according to claim 1, wherein said determining step determines the rotation matrix based on an inclination of a line connecting a highlight point and a shadow point in a luminance histogram for analysis and based on a luminance axis in a color space.

6. An image processing apparatus according to claim 2, wherein said sampling device thins the image data by a line unit.

7. An image processing apparatus according to claim 2, wherein said analyzer generates a luminance histogram for analysis by excluding the image data that have high luminance and high saturation.

8. An image processing apparatus according to claim 2, wherein said determining device determines the rotation matrix based on an inclination of a line connecting a highlight point and a shadow point in a luminance histogram for analysis and based on a luminance axis in a color space.

9. An image processing method, comprising:
   detecting highlight and shadow points of an original image taken with a digital camera, by using an image obtained by reducing a number of pixels from the original image;
   determining colors of the detected highlight and shadow points;
   obtaining, based on the detected highlight and shadow points and the determined colors, a rotation matrix for rotating the highlight and shadow points toward an axis which indicates a luminance of a color space; and
   executing, based on the obtained rotation matrix, a color correction on each pixel of the original image.

10. A method according to claim 9, further comprising executing a contrast adjustment on a component which indicates a luminance of the original image, in addition to the color correction.

11. A method according to claim 9, further comprising executing a saturation adjustment, in addition to the color correction.

12. A method according to claim 9, wherein a pixel included in the image obtained by reducing a number of pixels from the original image is either a pixel obtained by sampling the original image or a pixel obtained by excluding pixels with saturation exceeding a predetermined level.

13. A method according to claim 9, further comprising obtaining a matrix for moving the highlight and shadow points toward the axis, in addition to the rotation matrix.

14. An image processing apparatus, comprising:
   a detecting device for detecting highlight and shadow points of an original image taken with a digital camera, by using an image obtained by reducing a number of pixels from the original image;
   a determining device for determining colors of the detected highlight and shadow points;
   an obtaining device for obtaining, based on the detected highlight and shadow points and the determined colors, a rotation matrix for rotating the highlight and shadow points toward an axis which indicates a luminance of a color space; and
   a color correction device for executing, based on the obtained rotation matrix, a color correction on each pixel of the original image.

15. An apparatus according to claim 14, further comprising a contrast adjustment device for executing a contrast adjustment on a component which indicates a luminance of the original image, in addition to the color correction.

16. An apparatus according to claim 14, further comprising a saturation adjustment device for executing a saturation adjustment, in addition to the color correction.

17. An apparatus according to claim 14, wherein a pixel included in the image obtained by reducing a number of pixels from the original image is either a pixel obtained by sampling the original image or a pixel obtained by excluding pixels with saturation exceeding a predetermined level.

18. An apparatus according to claim 14, further comprising a matrix obtaining device for obtaining a matrix for moving the highlight and shadow points toward the axis, in addition to the rotation matrix.

19. An image processing method, comprising:
   detecting highlight and shadow points of an original image taken with a digital camera, by using an image obtained by reducing a number of pixels from the original image;
   determining colors of the detected highlight and shadow points;

obtaining, based on the detected highlight and shadow points and the determined colors, a rotation matrix for rotating the highlight and shadow points toward an axis which indicates a luminance of a color space;

executing, based on the obtained rotation matrix, a color correction on each pixel of the original image; and executing, on the original image after the color correction, a conversion for printing.

20. A method according to claim 19, further comprising executing a contrast adjustment on a component which indicates a luminance of the original image, in addition to the color correction.

21. A method according to claim 19, further comprising executing a saturation adjustment, in addition to the color correction.

22. A method according to claim 19, wherein a pixel included in the image obtained by reducing a number of pixels from the original image is either a pixel obtained by sampling the original image or a pixel obtained by excluding pixels with saturation exceeding a predetermined level.

23. A method according to claim 19, further comprising obtaining a matrix for moving the highlight and shadow points toward the axis, in addition to the rotation matrix.

24. An image processing apparatus, comprising:

a detecting device for detecting highlight and shadow points of an original image taken with a digital camera, by using an image obtained by reducing a number of pixels from the original image;

a determining device for determining colors of the detected highlight and shadow points;

an obtaining device for obtaining, based on the detected highlight and shadow points and the determined colors, a rotation matrix for rotating the highlight and shadow points toward an axis which indicates a luminance of a color space;

a color correction device for executing, based on the obtained rotation matrix, a color correction on each pixel of the original image; and a conversion device for executing, on the original image after the color correction, a conversion for printing.

25. An apparatus according to claim 24, further comprising a contrast adjustment device for executing a contrast adjustment on a component which indicates a luminance of the original image, in addition to the color correction.

26. An apparatus according to claim 24, further comprising a saturation adjustment device for executing a saturation adjustment, in addition to the color correction.

27. An apparatus according to claim 24, wherein a pixel included in the image obtained by reducing a number of pixels from the original image is either a pixel obtained by sampling the original image or a pixel obtained by excluding pixels with saturation exceeding a predetermined level.

28. An apparatus according to claim 24, further comprising an obtaining device for obtaining a matrix for moving the highlight and shadow points toward the axis, in addition to the rotation matrix.

* * * * *